(12) United States Patent
Cadarette et al.

(10) Patent No.: US 7,827,299 B2
(45) Date of Patent: Nov. 2, 2010

(54) TRANSITIONING BETWEEN HISTORICAL AND REAL TIME DATA STREAMS IN THE PROCESSING OF DATA CHANGE MESSAGES

(75) Inventors: Paul Michael Cadarette, Hemet, CA (US); Lawrence E. Kirk, Marshfield, MA (US); Robert Daniel Love, Littleton, NC (US); Gregg Andrew Upton, Santa Clara, CA (US); Anil Venkatesh Varkhedi, San Jose, CA (US); Charles Joseph Weigel, III, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 11/853,690

(22) Filed: Sep. 11, 2007

(65) Prior Publication Data
US 2009/0070355 A1    Mar. 12, 2009

(51) Int. Cl.
G06F 15/16 (2006.01)
G06F 7/00 (2006.01)
G06F 17/00 (2006.01)
(52) U.S. Cl. .................. 709/231; 707/609; 707/625; 707/638
(58) Field of Classification Search .................. None
See application file for complete search history.

(56) References Cited
U.S. PATENT DOCUMENTS
6,980,988 B1   12/2005   Demers et al.

(Continued)

OTHER PUBLICATIONS

Ravindran, K., and V. Bansal, "Delay Compensation Protocols for Synchronization of Multimedia Data Streams", IEEE Transaction on Knowledge and Data Engineering, Vl. 5, No. 4, Aug. 1993, pp. 574-589.

(Continued)

Primary Examiner—John B. Walsh
(74) Attorney, Agent, or Firm—Janaki K. Davda; Konrad Raynes & Victor LLP

(57) ABSTRACT

Provided are techniques for data stream switching. While accepting data change messages from a historical data stream, in response to determining that the end of the historical data stream is approaching, consumption from a real time data stream is resumed. In accepting data change messages from one of a historical data stream and a real time data stream, a data change message identifier (DCMID) for a data change message is obtained. Then, it is determined whether the data change message is from the real time data stream. In response to determining that the data change message is from the real time data stream, the DCMID is processed against a historical data structure to determine whether the related data change message has been seen in the historical data stream. In response to determining that the data change message is from the historical data stream, the DCMID is processed against a real time data structure to determine whether the related data change message has been seen in the real time data stream. It is determined whether a threshold for a number of DCMIDs that correspond to each other in the real time data stream and the historical data stream has been met. In response to determining that the threshold has been met, there is a switch from capturing data change messages in the historical data stream to capturing data change messages in the real time data stream.

21 Claims, 10 Drawing Sheets

U.S. PATENT DOCUMENTS

| | | | |
|---|---|---|---|
| 7,321,898 B1 * | 1/2008 | Luo et al. | 1/1 |
| 2002/0006128 A1 | 1/2002 | Yehuda et al. | |
| 2002/0122430 A1 | 9/2002 | Haberman et al. | |
| 2002/0174139 A1 * | 11/2002 | Midgley et al. | 707/204 |
| 2005/0033777 A1 | 2/2005 | Moraes et al. | |
| 2005/0172028 A1 | 8/2005 | Nilsson et al. | |
| 2005/0251540 A1 | 11/2005 | Sim-Tang | |
| 2006/0233322 A1 | 10/2006 | Allman et al. | |
| 2007/0027913 A1 | 2/2007 | Jensen et al. | |

OTHER PUBLICATIONS

Schmidt, S., T. Legler, D. Schaller, and W. Lehner, "Real-Time Scheduling for Data Stream Management Systems", Proceedings of the 17th Euromicro Conference on Real-Time Systems, Jul. 2005, pp. 167-176.

Wei, Y., V. Prasad, S.H. Son, and J.A. Stankovic, "Prediction-Based QoS Management for Real-Time Data Streams", Proceedings of the 27th IEEE International Real-Time Systems Symposium, Dec. 2006, pp. 344-358.

Wei, Y., S.H. Son, and J.A. Stankovic, "RTSTREAM: Real-Time Query Processing for Data Streams", Proceedings of the Ninth IEEE International Symposium on Object and Component-Oriented Real-Time Distributed Computing, Apr. 2006, 10 pp.

* cited by examiner

HISTORICAL LINKED LIST

HISTORICAL LINKED LIST

HISTORICAL LINKED LIST

HISTORICAL LINKED LIST

HISTORICAL LINKED LIST

REAL TIME LINKED LIST

HISTORICAL LINKED LIST

TRANSITIONING BETWEEN HISTORICAL AND REAL TIME DATA STREAMS IN THE PROCESSING OF DATA CHANGE MESSAGES

BACKGROUND

1. Field

Embodiments of the invention relate to automatically transitioning between historical and real time data streams in the processing of data change messages.

2. Description of the Related Art

In many cases, two data streams are available for use when capturing data changes from a database management system, file management system, or other data source ("data source"): a real time data stream and a historical data stream (e.g., a stream or collection of log records). The real time data stream contains information about recently performed data changes. The historical data stream contains information about data changes that have occurred over a longer period of time. Often, the real time data stream has attributes that favor its use over the historical data stream. For example, the real time data stream may be available via direct memory reference, while the historical data stream may require access to mass storage devices (e.g., disk or tape). Additionally, the real time data stream usually exhibits minimal delay in making the data available to the data capture process (e.g., a data capture program), while the historical data stream may exhibit delays anywhere from seconds to hours due to delays in writing changes to logging media and media sharing characteristics. A data capture program may be described as a program that captures changes which occur against a data source. The captured changes may be replicated (e.g., duplicated to another database) or published as an audit trail.

In an ideal world, the data capture program would process only the real time data stream; however, there are situations in which the data capture program prefers to or has to process the historical data stream in order to capture all of the data changes that have occurred against the data source. An example of such a situation is one in which the data capture program is terminated while a data source program continues to execute. In this situation, it is desirable to process the historical data stream only up to the time that it is possible to switch back to the real time data stream. Unfortunately, this switch from using the historical data stream to using the real time data stream is not necessarily a simple process. Instead, the process of switching is complicated by the fact that the two data streams may not be in exactly the same order and may not contain identical data. In addition, switching from historical to real time data streams while data changes are being written creates a race condition that must be reconciled to ensure that data loss or duplication of the published data does not occur.

At present, the responsibility to perform the switch between using the historical data stream and using the real time data stream falls to an administrator of the data capture program and usually requires that the data source program be quiesced for some period of time to insure that the historical data stream is completely consumed before data changes begin flowing from the real time data stream.

Thus, transition from the processing of the historical data stream to the real time data stream is currently a manual process that requires a period of data source quiescence. There is a need in the art for improved switching between the historical and real time data streams.

SUMMARY OF EMBODIMENTS OF THE INVENTION

Provided are a method, computer program product, and system for data stream switching. While accepting data change messages from one of a historical data stream and a real time data stream, a data change message identifier (DCMID) for a data change message is obtained. Then, it is determined whether the data change message is from the real time data stream. In response to determining that the data change message is from the real time data stream, the DCMID is processed against a historical data structure to determine whether the related data change message has been seen in the historical data stream. In response to determining that the data change message is from the historical data stream, the DCMID is processed against a real time data structure to determine whether the related data change message has been seen in the real time data stream. It is determined whether a threshold for a number of DCMIDs that correspond to each other in the real time data stream and the historical data stream has been met. In response to determining that the threshold has been met, there is a switch from capturing data change messages in the historical data stream to capturing data change messages in the real time data stream.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments provide a switch technique for automating the switch from using a historical data stream to using a real time data stream. This switch technique deals with situations in which the data streams are identical, as well as with situations in which the data streams are not identically ordered and/or the data streams do not contain identical data. Additionally, embodiments generalize the switch technique to allow a single data capture process to handle the nuances of the switch for different data sources.

Thus, while accepting data change messages from a historical data stream, in response to determining that the end of the historical data stream is approaching, consumption from a real time data stream is resumed.

Figure 1:
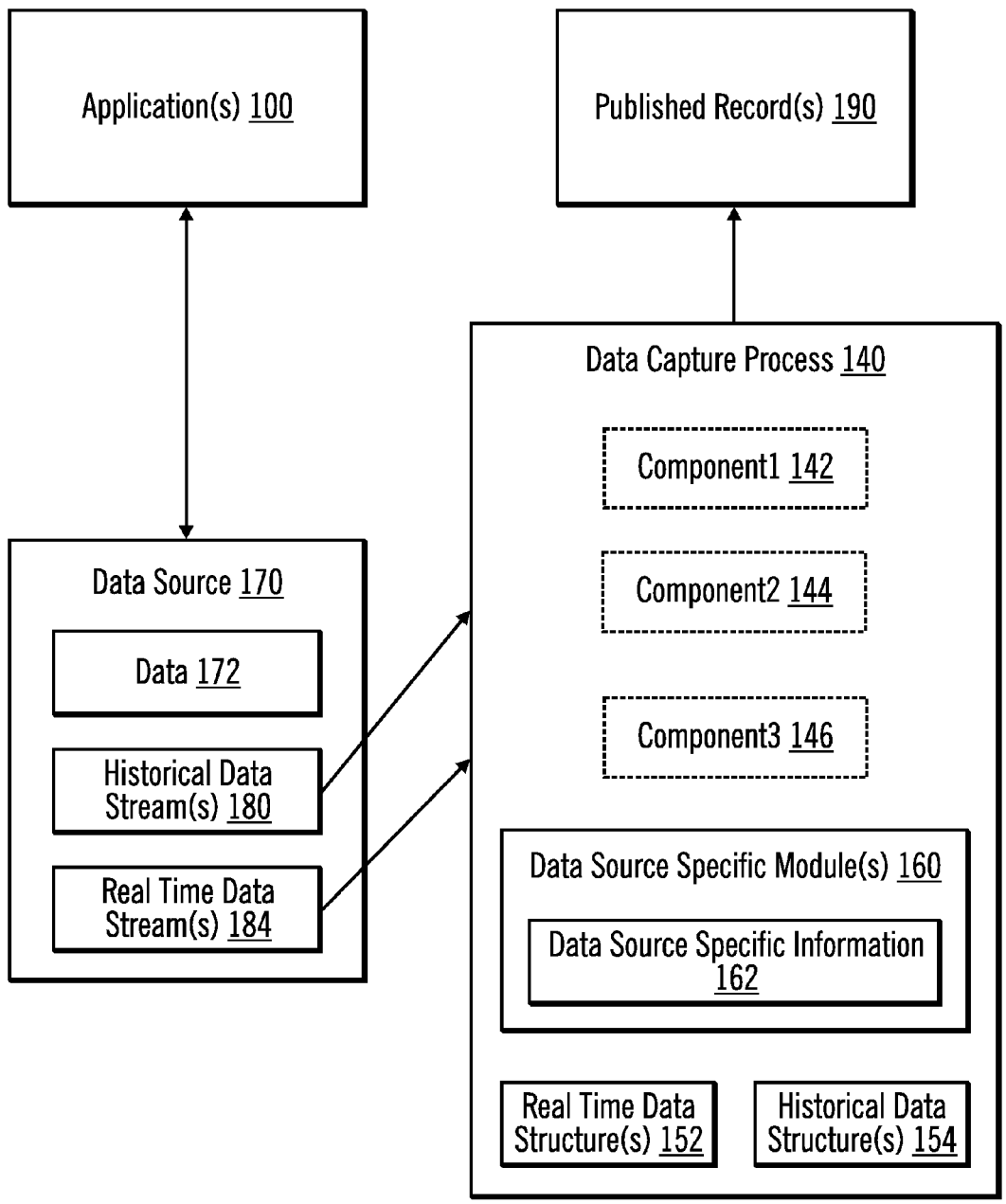
FIG. 1 illustrates details of a computing environment in accordance with certain embodiments.

FIG. 1 illustrates details of a computing environment in accordance with certain embodiments. One or more applications 100 is coupled to one or more data sources 170. Each data source 170 includes data 172, one or more historical data streams 180, and one or more real time data streams 184. An application 100 may submit changes to the data 172 in a data source 170. The data source 170 modifies the data 172 and produces a record of the data modification in a historical data stream 180 and in a real time data stream 184.

The data capture process 140 reads the record of data modifications from either the real time data stream 184 or from the historical data stream 180. Generally, the real time data stream 184 can be processed with less processor cost and with less delay, so the use of the real time data stream 184 is favored by the data capture process 140. In situations in which the real time data stream 184 cannot be processed by the data capture process 140, the data capture process 140 processes the data from the historical data stream 180. This allows the data capture process 140 to obtain a complete record of all data modifications to a data source 170.

The data capture process 140 includes one or more data source specific module(s) 160 which are responsible for processing the record of the data change from either the real time data stream 184 or the historical data stream 180. Each data source specified module 160 is augmented to return data source specific information 162. The data source specific module(s) 160 convert the data modification to a form that is suitable for publication as a published record 190.

Embodiments augment the data capture process 140 to include three components. Component1 142 is responsible for recognizing that the two data streams 180, 184 are likely to be close enough to each other to allow for a successful switch operation. Component2 144 is responsible for extracting a unique string from each data change message for the purpose of comparing the one data stream 180, 184 with the other data stream 180, 184. A data change message may be described as a message that describes a change to the data 172. Component3 146 is responsible for determining that the two data streams 180, 184 have corresponded to a degree sufficient to allow a switch from the historical data stream 180 to the real time data stream 184 without the risk of losing data changes. The data capture process 140 may consist of more or fewer components that capture the functionality of component1 142, component2 144, and component3 146.

Component1 142 identifies the possibility for a successful switch. In certain embodiments, for performance reasons, real time data stream 184 capture is suspended while historical data streams 180 are being processed. For data stream switch processing, real time data stream 184 processing may be resumed at a point in time at which the resume is requested. The data capture process 140 recognizes that the end of the historical data stream 180 is nearing by determining that timestamps that are present in the historical data stream 180 are approaching the current time or by a transient end of data condition being returned on the historical data stream 180. When either of these conditions occurs, the data capture process 140 recognizes the opportunity to switch to the real time data stream 184. In this situation, the data capture process 140 resumes the real time data stream 184 as well as the other components of this invention.

Component2 144 extracts a Data Change Message IDentifier (DCMID) from each data change message. The data change messages are of arbitrary length, and, in some cases, the content of a given data change message on the real time data stream 184 does not exactly match the content of a corresponding data change message in the historical data stream 180. To reconcile differences between the two data streams 180, 184, component2 144 calls the data source specific module 160 to extract the DCMID from a data change message, where the extracted DCMID is used to unambiguously relate a data change message on one data stream 180, 184 to the same data change message on the other data stream 180, 184. The DCMID is a unique identifier that serves a dual purpose by reducing the amount of data needed to reconcile data streams 180, 184. In embodiments in which a data source 170 marks each data change (described with a data change message) with a common unique timestamp in both data streams 180, 184, the DCMID would be that timestamp. In embodiments in which data sources 170 do not mark each data change with a common unique timestamp, the timestamp is not used as the DCMID because different timestamp values may be used in the different data streams 180, 184. In these embodiments, the data source specific module 160 extracts fields from the data change message to construct a suitable DCMID.

Component3 146 establishes correspondence between the two data streams 180, 184. Establishing correspondence between the two data streams 180, 184 is done in various situations. In situations in which the data change messages in the two data streams 180, 184 occur in the same order or situations in which a data change message in one data stream 180, 184 can be uniquely and unambiguously matched with a corresponding data change message in the other data stream 180, 184, the two data streams 180, 184 can be deemed to correspond as soon as a single match of DCMIDs is detected between the two data streams 180, 184. It is more difficult to establish correspondence between the two data streams 180, 184 when the order of the data change messages differs from one data stream 180, 184 to the other data stream 180, 184 or where it is not always possible to unambiguously match a data change message in one data stream 180, 184 to its related data change message in the other data stream 180, 184. Embodiments provide support for all of these situations by way of a historical data structure 154 (i.e., an indexed linked list of unmatched DCMIDs built from the historical data stream 180) and a real time data structure 152 (i.e., an indexed linked list of unmatched data change messages built from the real time data stream 184).

Figure 2:
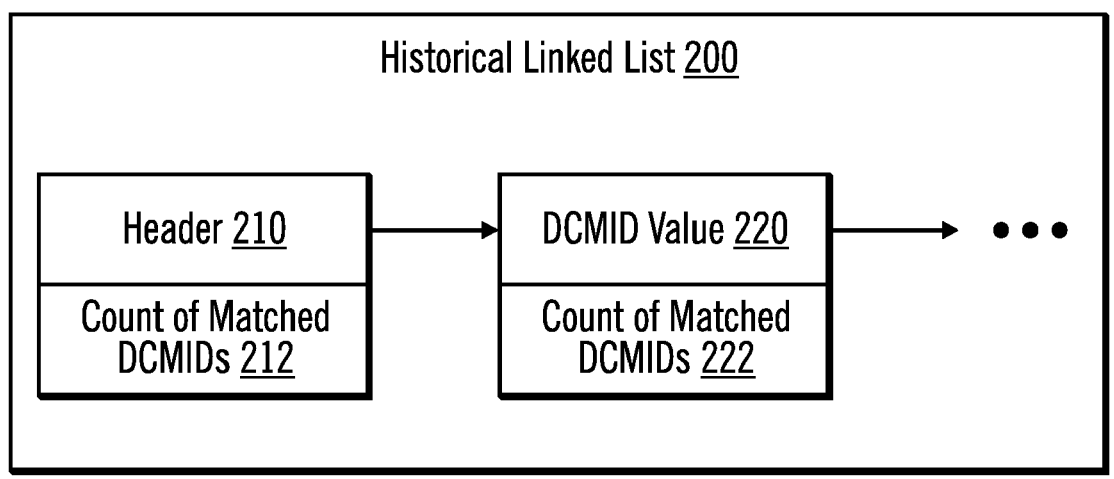
FIG. 2 illustrates a historical linked list in accordance with certain embodiments.

FIG. 2 illustrates a historical linked list 200 in accordance with certain embodiments. The historical linked list 200 is an example of a historical data structure 154. The historical linked list 200 includes elements linked together. The first element is a header element including header 210 and a count of matched DCMIDs 212. Each element in the historical linked list 200 other than the header element includes an unmatched DCMID value 220 and a count of matched DCMIDs. The ellipses in FIG. 2 indicate that there may be any number of elements in the historical linked list 200. The count represents a number of DCMIDs that have been matched following the particular element in a linked list. For example, for the historical linked list 200, the count 212 represents matched entries that occurred between the header and the first actual DCMID in the list 220. The count 222 represents matched entries that occurred after entry 220, but before the next entry in the historical linked list 200.

When the switch opportunity is recognized, component3 146 constructs the historical data structure 154 based on the data change messages received from the historical data stream 180. The historical data structure 154 is indexed based on the DCMID of the data change message, and the linked list order is determined by the order of the data change messages in the historical data stream 180. This indexed historical data structure 154 is used for three purposes:

1) Due to timing issues in recognizing a switch opportunity, it is possible for the historical data stream 180 to contain data change messages prior to the first data change message received via the real time data stream 184. This indexed historical data structure 154 provides a mechanism for accommodating this situation.

2) Due to buffering issues, it is possible for a series of historical data stream 180 data change messages to be processed prior to the processing of the related real time data stream 184 data change messages. This indexed historical data structure 154 provides a mechanism for accommodating this situation.

3) The indexed historical data structure 154 provides a mechanism to accommodate the situation in which more than one data change message are to be matched prior to determining that data stream correspondence has occurred.

Figure 3:
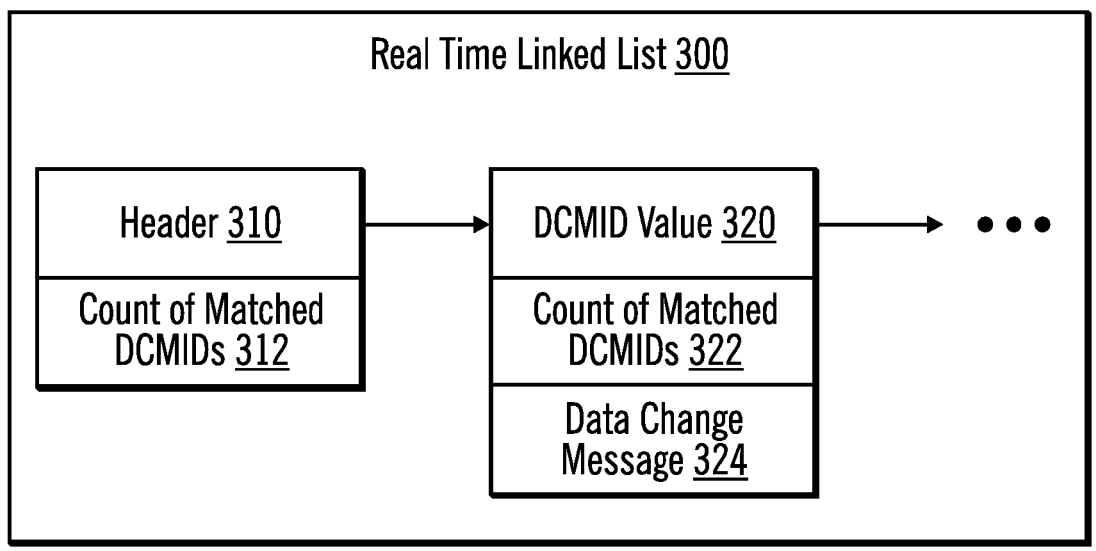
FIG. 3 illustrates a real time linked list in accordance with certain embodiments.

FIG. 3 illustrates a real time linked list 300 in accordance with certain embodiments. The real time linked list 300 is an example of a real time data structure 152. The real time linked list 300 includes elements linked together. The first element is a header element including header 310 and a count of matched DCMIDs 312. Each element in the real time linked list 300 other than the header element includes an unmatched DCMID value 320, a count of matched DCMIDs 322, and a data change message 324. The ellipses in FIG. 3 indicate that there may be any number of elements in the real time linked list 300. The count represents a number of DCMIDs that have been matched following the particular element in a linked list.

The indexed real time data structure 152 of data change messages is constructed based on data change messages that are received from the real time data stream 184 after the switch opportunity is recognized. The index to the list is the DCMID of the real time data stream 184 data change message. The real time data structure 152 contains the data change messages and is ordered by the sequential order of the data change messages in the real time data stream 184. This indexed real time data structure 152 is used for two purposes:

1) The real time data structure 152 addresses the situation in which, due to buffering issues, a series of real time data stream 184 data change messages are processed prior to the related historical data stream 180 data change messages.

2) The real time data structure 152 allows for a more flexible transition from processing the historical data stream 180 to processing the real time data stream 184.

Embodiments enable data source specific processing. In certain embodiments, the data capture process 140 is used by IBM WebSphere™ Classic Data Event Publisher for z/OS® and IBM WebSphere™ Classic Replication Server for z/OS® from International Business Machines, Corporation, which supports the capture of changes from multiple data sources, including: Virtual Storage Access Method (VSAM) data sources, and Information Management System (IMS) data sources. (WebSphere and z/OS are registered trademarks or common law marks of International Business Machines Corporation in the United States and/or other countries) To enable data source specific processing, the data source specific module 160 is augmented to return data source specific information 162:

1) A data source specific threshold number of messages that are to match before correspondence between the data streams 180, 184 is signaled for that data source 170 (i.e., that a threshold number of DCMIDs that correspond to each other (e.g., have been seen) in the real time data stream 184 and the historical data stream 180 are found). In certain embodiments, in the situation in which the real time data stream 184 and the historical data stream 180 are in identical order, a data source specific threshold number of one may be appropriate. In certain embodiments, where the real time data stream 184 and the historical data stream 180 are not in identical order, a data source specific threshold number greater than one may be appropriate.

2) A data source specific size of the DCMID value.

Figure 4A:
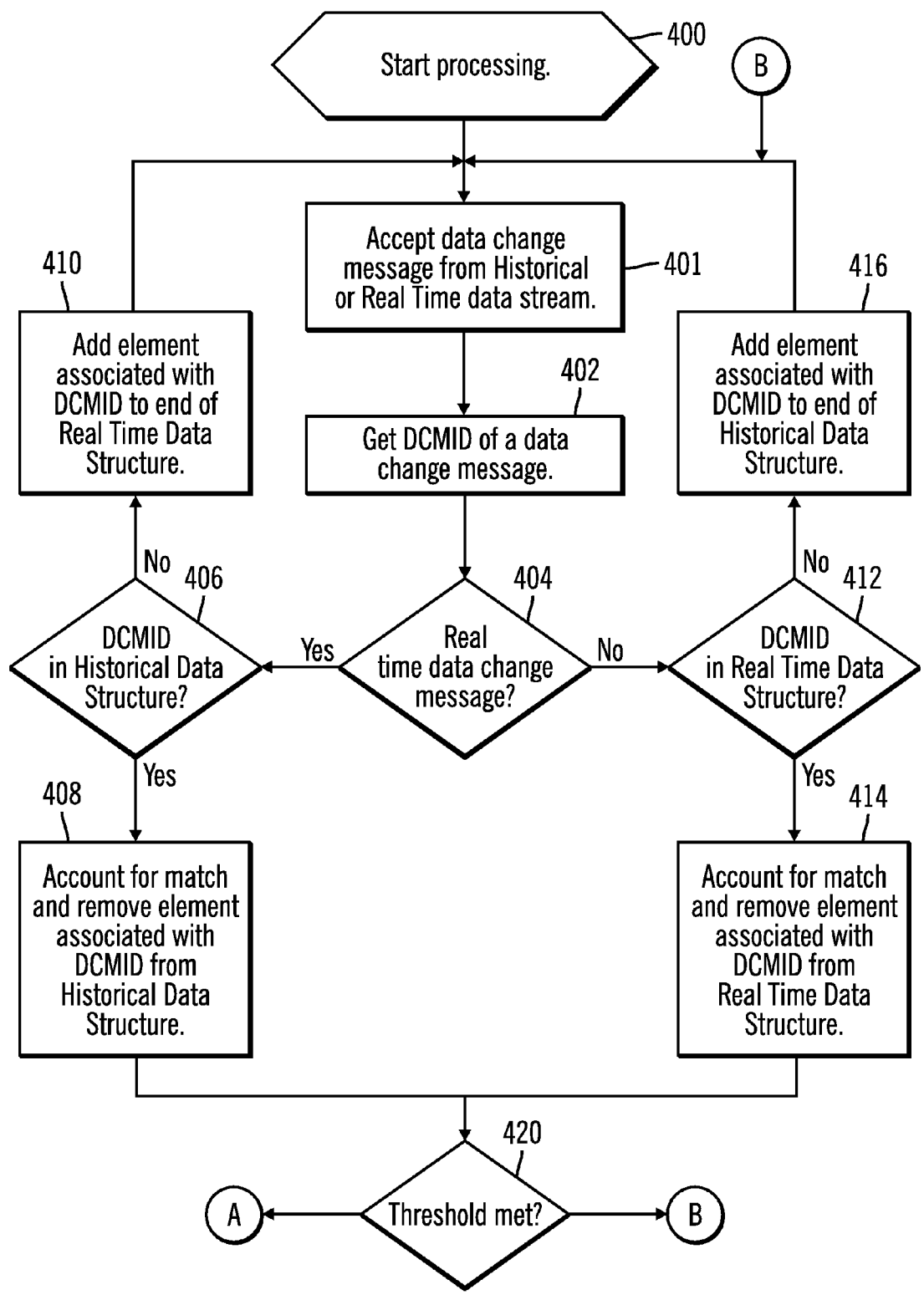
FIGS. 4A and 4B illustrate logic performed by a data capture process in accordance with certain embodiments.
Figure 4B:
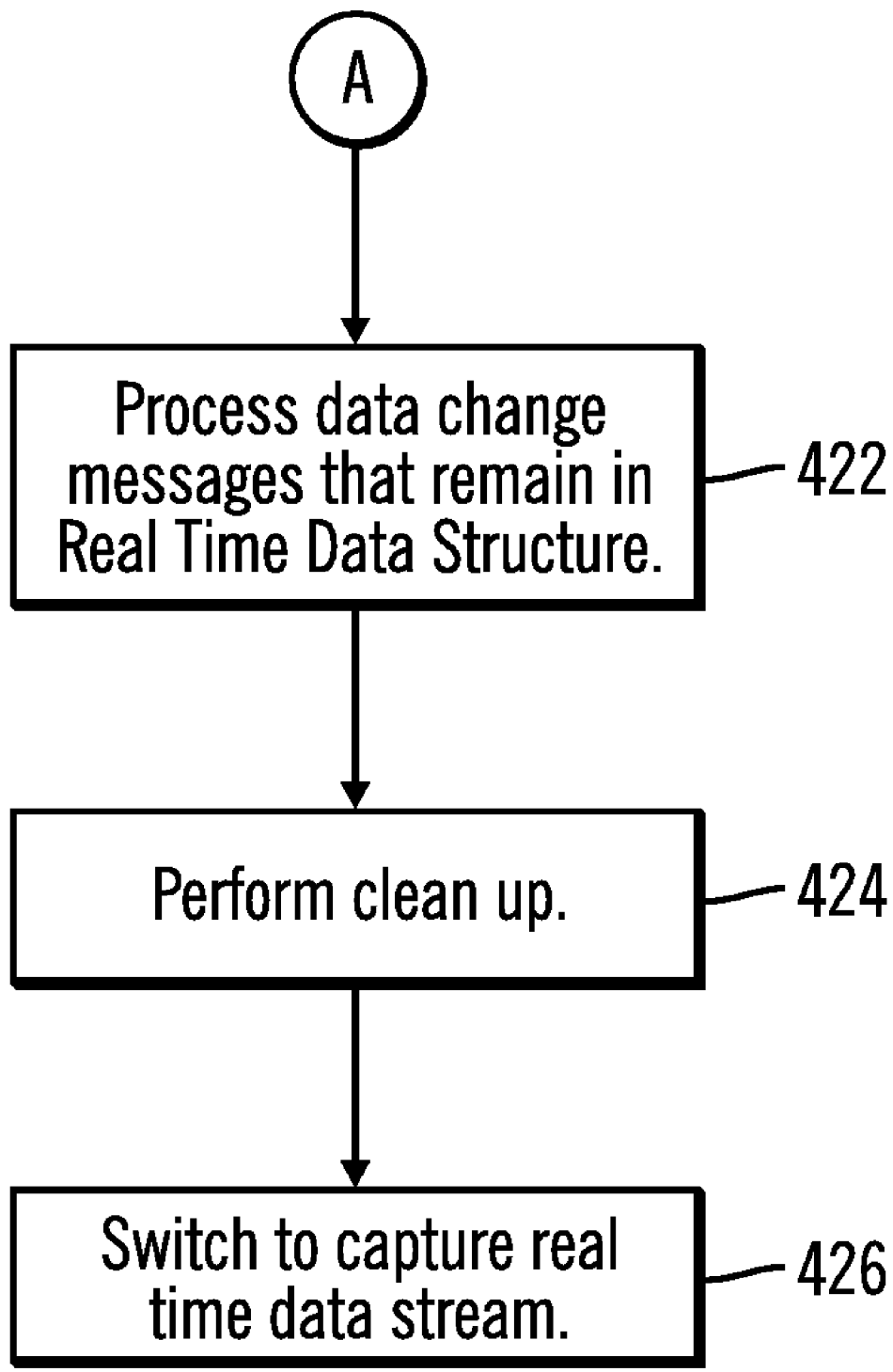

FIGS. 4A and 4B illustrate logic performed by the data capture process 140 in accordance with certain embodiments. Control begins in block 400 (FIG. 4A) with the data capture process 140 beginning its processing. In certain embodiments, initialization is handled by component1 142, which will restart the production of the real time data stream 184 and will invoke the appropriate data source specific module 160 to retrieve the data source specific information 162. In block 401, a data change message from the real time or historical data stream 180, 184 is accepted for processing. In block 402, the data capture process 140 gets the DCMID of a data change message. This DCMID is data source specific. In block 404, the data change process 140 determines whether the data change messages is from the real time data stream 184. If so, processing continues to block 406, otherwise, processing continues to block 412.

In block 406, the data change process 140 determines whether the DCMID of the real time data stream data message is in the historical data structure 154. If so, processing continues to block 408, otherwise, processing continues to block 410. That is, in response to determining that the data change message is from the real time data stream 184, the DCMID is processed against a historical data structure 154 to determine whether the related data change message has been seen in the historical data stream 180. In response to determining that the data change message is from the historical data stream 180, the DCMID is processed against a real time data structure 152 to determine whether the related data change message has been seen in the real time data stream 184.

In block 408, the data change process 140 accounts for the match and removes the element associated with the DCMID from the historical data structure 154 and processing continues to block 420. Accounting for the match requires that the count of matched elements 222 for the removed element be incremented by one and that value added to the count of matched elements for the predecessor of the removed element in a data structure 154. In block 410, the data change process 140 adds an element associated with the DCMID to the end of the real time data structure 152 and processing loops back to block 401.

In block 412, the data change process 140 determines whether the DCMID of the historical data stream data message is in the real time data structure 152. If so, processing continues to block 414, otherwise, processing continues to block 416. In block 414, the data change process 140 accounts for the match and removes the element associated with the DCMID from the real time data structure 152 and processing continues to block 420. Accounting for the match requires that the count of matched elements 322 for the removed element be incremented by one and that value added to the count of matched elements for the predecessor of the removed element in the data structure 152. In block 416, the data change process 140 adds an element associated with the DCMID to the end of the real time data structure 152 and processing loops back to block 401.

In block 420, the data change process 140 determines whether the threshold is met. The threshold is data source specific (e.g., may be determined from the data source specific information 162). If so, processing continues to block 422 (FIG. 4B), otherwise, processing loops back, to block

401 (FIG. 4A). In block 422, the data change process 140 processes data change messages that remain in the real time data structure 152. That is, when a number of consecutive matches equals or exceeds the data source specific threshold, the data capture process 140 recognizes correspondence between the data streams 180, 184. In block 424, cleanup is performed. To perform clean up, the data capture process 140 frees resources associated with switch processing, closes the historical data stream 180, and signals that the switch has completed. In block 426, the data capture process 140 switches to capturing the real time data stream 184.

While engaged in switch processing, data change messages from the historical data stream 180 undergo normal processing by the data source specific module 160 and are published. Data changes from the real time data stream 184 are used to maintain the real time data structure 152 and are not published.

In certain embodiments, the historical data stream 180 processing includes obtaining the DCMID for the data change message from the data source specific module 160 and checking the real time linked list 300 for the DCMID. If the DCMID is found in the real time linked list 300, the found entry is removed from the real time linked list 300 and the data capture process 140 then accounts for the match in the historical linked list 200. If the DCMID is not found in the real time linked list 300, an entry with the DCMID is added to the historical linked list 200.

In certain embodiments, the real time data stream 184 processing includes obtaining the DCMID for the data change message from the data source specific module 160 and checking the historical linked list 200 for the DCMID. If the DCMID is found in the historical linked list 200, the found entry is removed from the historical linked list 200, and the data capture process 140 then accounts for the match in the historical linked list 200. If the DCMID is not found in the historical linked list 200, an entry with the DCMID is added to the real time linked list 300.

As can be seen in FIGS. 2 and 3, the historical and real time linked lists 200, 300 are similar, but not identical. Each linked list 200, 300 consists of a header entry and one entry for each unmatched DCMID in the linked list 200, 300. Entries contain the DCMID value (with no value for the header entry), a count of matched entries, and, in the case of the real time linked list 300, the real time data change message associated with the DCMID value.

Merely to enhance understanding of embodiments, FIGS. 5A-5D illustrate a first example in accordance with certain embodiments.

Figure 5A:
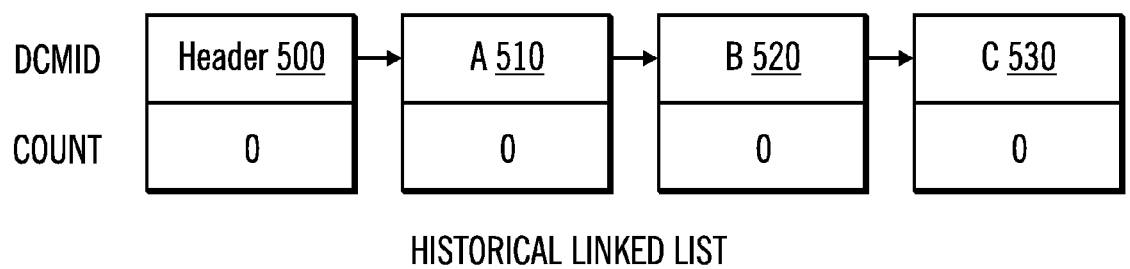
FIGS. 5A-5D illustrate a first example in accordance with certain embodiments.

With reference the first example, three entries arrive from the historical data stream 180 in the order A, B, C. FIG. 5A illustrates a historical linked list that results from the processing of entries A, B, and C. The historical linked list shows a header 500, three entries 510, 520, 530, and that no matched entries have been seen (i.e., all of the counts are zero). If real time data from a real time data stream 184 is now received, in the order A, C, B, then the historical linked list is updated as shown in FIGS. 5B-5D.

Figure 5B:
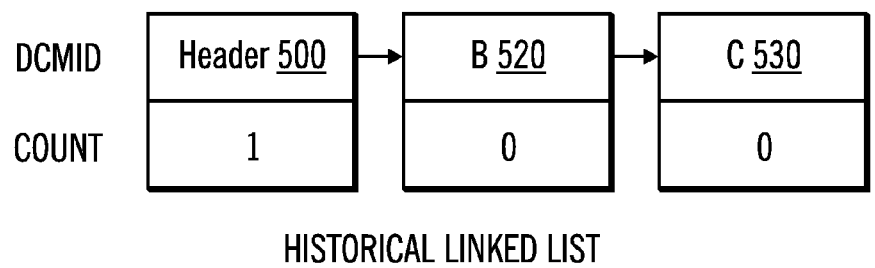
Figure 5C:
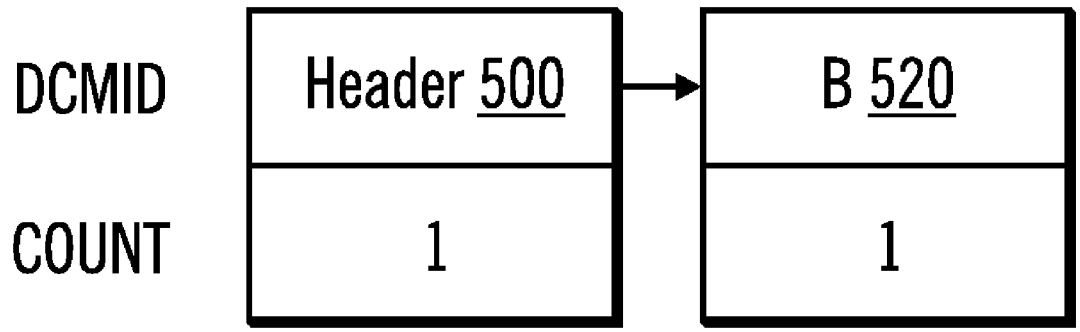

In particular, FIG. 5B illustrates the historical linked list after the real time A entry is received. After the real time A entry is received, the match count of the predecessor of the A entry (the header 500 in this case) is increased by the match count of the A entry plus 1, and the A entry is deleted. Thus, in FIG. 5B, the historical linked list shows the header 500, two entries 520, 530, and that the count associated with the header 500 is one.

Similar processing takes place when the C entry is received. Thus, FIG. 5C illustrates the historical linked list after the real time C entry is received. In FIG. 5C, the historical linked list shows the header 500, one entry 520, that the count associated with the header 500 is one, and that the count associated with the entry 520 is one.

Figure 5D:
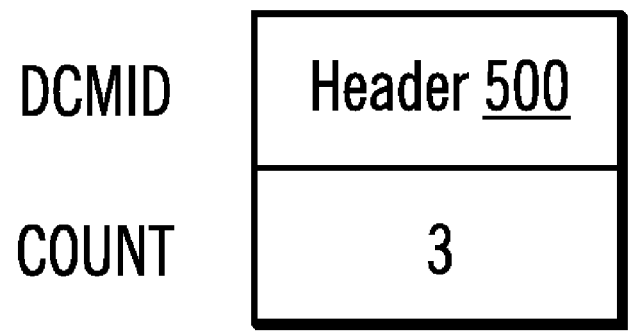

FIG. 5D illustrates the historical linked list after the real time B entry is received. In FIG. 5D, the historical linked list shows the header 500 and that the count associated with the header 500 is three. The historical linked list of FIG. 5D indicates that there are currently no unmatched entries in the historical linked list and that three data changes have been matched between the historical and real time data streams 180, 184. In this situation, if the match threshold were two or three, then the data capture process 140 would recognize that the data streams 180, 184 had corresponded, process messages which remain on the real time linked list, clean up, and switch to processing directly from the real time data stream 184.

Figure 6A:
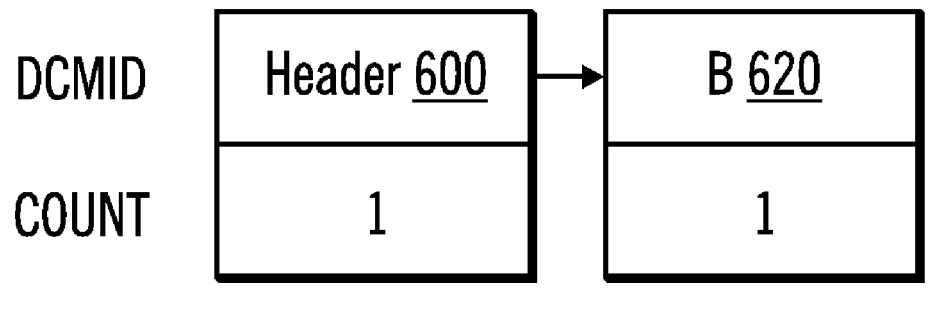
FIGS. 6A-6C illustrate a second example in accordance with certain embodiments.
Figure 6B:
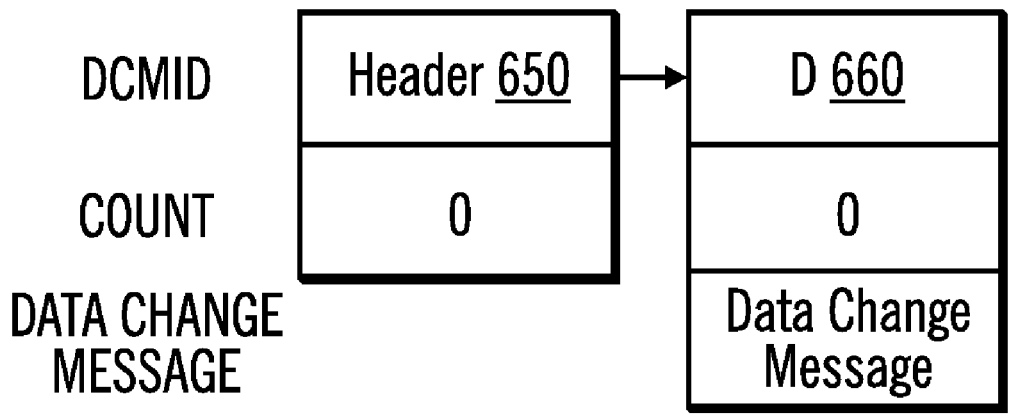
Figure 6C:
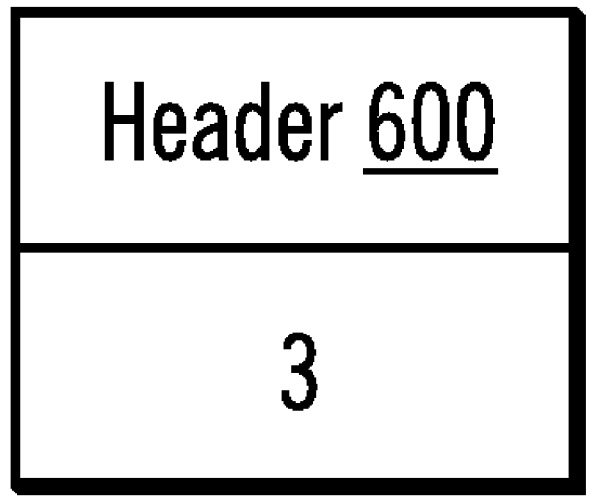

Merely to enhance understanding of embodiments, FIGS. 6A-6C illustrate a second example in accordance with certain embodiments.

Including the actual data change message in the real time linked list 300 is done to accommodate the processing of block 422 (i.e., "process data change messages that remain in real data structure"). For an example of this, consider the situation in which three entries arrive from the historical data stream 180 in the order A, B, C, the match threshold is three, and the real time messages arrive in the order A, C, D, B. FIG. 6A shows the historical linked list after the real time messages A and C have been processed. In FIG. 6A, the historical linked list shows the header 600, one entry 620, that the count associated with the header 600 is one (reflecting the match for the real time A message), and that the count associated with the entry 620 is one (reflecting the match for the real time C message).

Now, when real time message D is seen, a real time linked list entry is created. FIG. 6B illustrates a real time linked list structure that includes header 650, entry 660, that the count associated with the header 650 is zero, and that the count associated with the entry 660 is zero.

Next, real time message B is seen, resulting in the historical linked list of FIG. 6C. In FIG. 6C, the historical linked list shows the header 600 and that the count associated with the header 600 is three.

Since there is a match count of three, the threshold of three is satisfied. Since the threshold is satisfied, termination processing is entered, which includes processing any unmatched entries which remain on the real time linked list. Processing is done in this manner to allow switching to the real time data stream 184 as soon as the match threshold is reached. If the real time data change message were not stored in the real time linked list, then the real time linked list would have to be empty before data stream correspondence could be recognized and transitioning to processing the real time data stream 184 could occur.

Embodiments are useful in any situation in which correspondence between two related data streams is to be established. Embodiments are able to bolt on this switching capability without any assistance from or integration with the data source program.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The computer-usable medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk—read only memory (CD-ROM), compact disk—read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 4A and 4B describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 4A and 4B may be implemented in software, hardware, programmable and non-programmable gate array logic or in some combination of hardware, software, or gate array logic.

Figure 7:
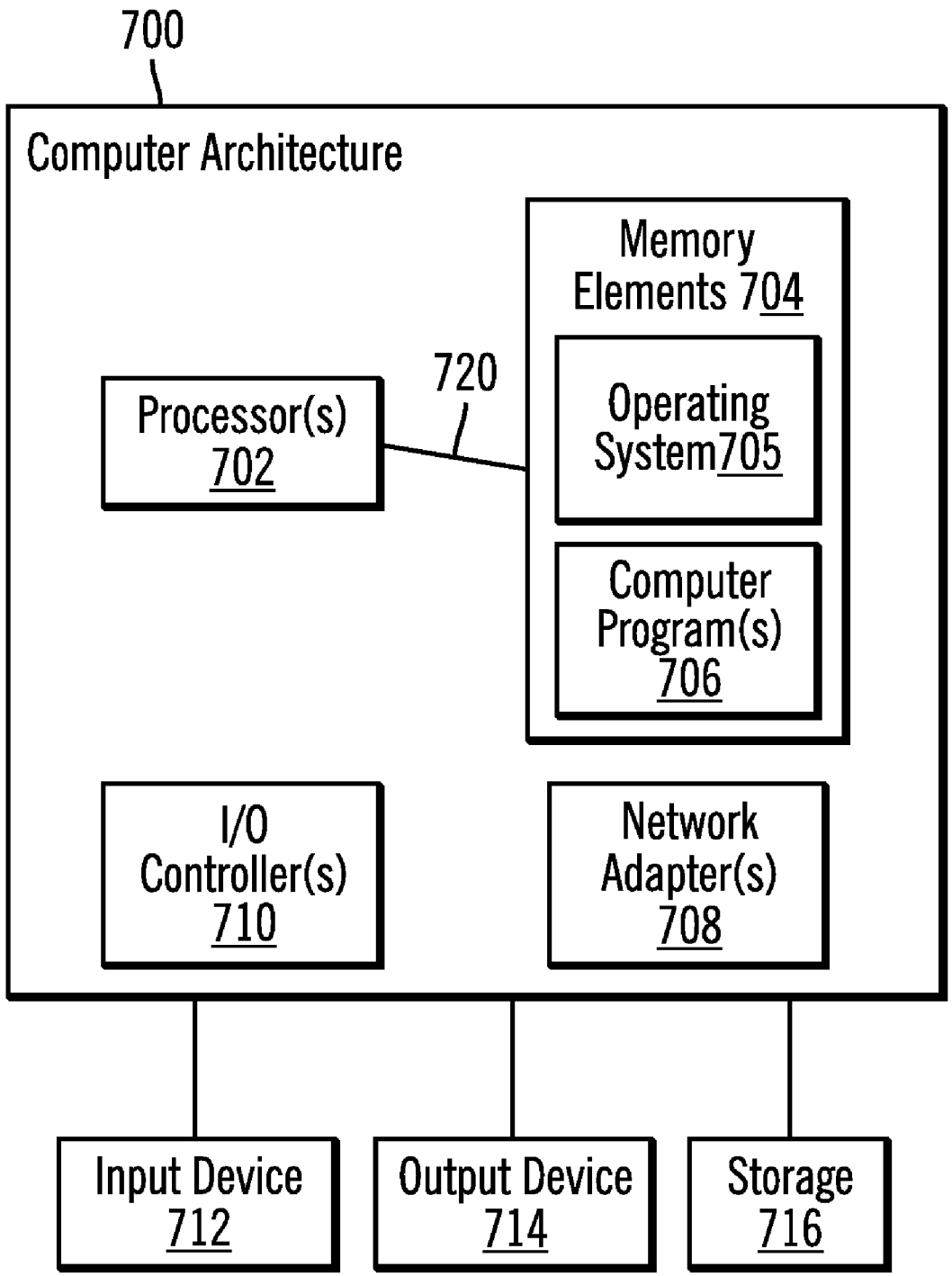
FIG. 7 illustrates a system architecture that may be used in accordance with certain embodiments.

FIG. 7 illustrates a system architecture 700 that may be used in accordance with certain embodiments. Client computer 100 and/or server computer 120 may implement system architecture 700. The system architecture 700 is suitable for storing and/or executing program code and includes at least one processor 702 coupled directly or indirectly to memory elements 704 through a system bus 720. The memory elements 704 may include local memory employed during actual execution of the program code, bulk storage, and cache memories which provide temporary storage of at least some program code in order to reduce the number of times code must be retrieved from bulk storage during execution. The memory elements 704 include an operating system 705 and one or more computer programs 706.

Input/Output (I/O) devices 712, 714 (including but not limited to keyboards, displays, pointing devices, etc.) may be coupled to the system either directly or through intervening I/O controllers 710.

Network adapters 708 may also be coupled to the system to enable the data processing system to become coupled to other data processing systems or remote printers or storage devices through intervening private or public networks. Modems, cable modem and Ethernet cards are just a few of the currently available types of network adapters 708.

The system architecture 700 may be coupled to storage 716 (e.g., a non-volatile storage area, such as magnetic disk drives, optical disk drives, a tape drive, etc.). The storage 716 may comprise an internal storage device or an attached or network accessible storage. Computer programs 706 in storage 716 may be loaded into the memory elements 704 and executed by a processor 702 in a manner known in the art.

The system architecture 700 may include fewer components than illustrated, additional components not illustrated herein, or some combination of the components illustrated and additional components. The system architecture 700 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method, comprising:
while accepting data change messages from one of a historical data stream and a real time data stream,
obtaining, using a computer including a processor, a data change message identifier (DCMID) for a data change message;
determining whether the data change message is from the real time data stream;
in response to determining that the data change message is from the real time data stream, processing the DCMID against a historical data structure to determine whether the related data change message has been seen in the historical data stream;
in response to determining that the data change message is from the historical data stream, processing the DCMID against a real time data structure to determine whether the related data change message has been seen in the real time data stream;
determining whether a threshold for a number of DCMIDs that correspond to each other in the real time data stream and the historical data stream has been met; and
in response to determining that the threshold has been met, switching from capturing data change messages in the historical data stream to capturing data change messages in the real time data stream.

2. The method of claim 1, wherein processing the DCMID using the historical data structure further comprises:
determining whether the DCMID is in the historical data structure;
in response to determining that the DCMID is in the historical data structure, removing an entry including the DCMID from the historical data structure and updating one or more counts of a number of matches in the historical data structure; and
in response to determining that the DCMID is not in the historical data structure, adding an entry including the DCMID to an end of the real time data structure.

3. The method of claim 2, wherein processing the DCMID using the real time data structure further comprises:
in response to determining that the data change message is from a historical data stream,
determining whether the DCMID is in a real time data structure;
in response to determining that the DCMID is in the real time data structure, removing an entry including the DCMID from the real time data structure and updating one or more counts of a number of matches in the real time data structure; and
in response to determining that the DCMID is not in the real time data structure, adding an entry including the DCMID to an end of historical data structure.

4. The method of claim 1, wherein the threshold comprises a data source specific threshold.

5. The method of claim 1, wherein the DCMID comprises a data source specific DCMID with a data source specific size and composition.

6. The method of claim 1, wherein the real time data structure stores real time data change messages and further comprising:
processing the real time data change messages in the real time data structure when the switching is concluded.

7. The method of claim 1, further comprising:
performing clean up by freeing resources associated with the switching, closing the historical data stream, and signaling that the switching has completed.

8. A computer program product comprising a computer-readable storage medium including a computer readable program, wherein the computer readable program when executed by a processor on a computer causes the computer to:
while accepting data change messages from one of a historical data stream and a real time data stream,
obtain a data change message identifier (DCMID) for a data change message;
determine whether the data change message is from a real time data stream;
in response to determining that the data change message is from the real time data stream, process the DCMID against a historical data structure to determine whether the related data change message has been seen in the historical data stream;
in response to determining that the data change message is from the historical data stream, process the DCMID against a real time data structure to determine whether the related data change message has been seen in the real time data stream;
determine whether a threshold for a number of DCMIDs that correspond to each other in the real time data stream and the historical data stream has been met; and
in response to determining that the threshold has been met, switch from capturing data change messages in the historical data stream to capturing data change messages in the real time data stream.

9. The computer program product of claim 8, wherein when processing the DCMID using the historical data structure, the computer readable program when executed on a computer causes the computer to:
determine whether the DCMID is in the historical data structure;
in response to determining that the DCMID is in the historical data structure, remove an entry including the DCMID from the historical data structure and updating one or more counts of a number of matches in the historical data structure; and
in response to determining that the DCMID is not in the historical data structure, add an entry including the DCMID to an end of the real time data structure.

10. The computer program product of claim 9, wherein when processing the DCMID using the real time data structure, the computer readable program when executed on a computer causes the computer to:
in response to determining that the data change message is from a historical data stream,
determine whether the DCMID is in a real time data structure;
in response to determining that the DCMID is in the real time data structure, remove an entry including the DCMID from the real time data structure and updating one or more counts of a number of matches in the real time data structure; and
in response to determining that the DCMID is not in the real time data structure, add an entry including the DCMID to an end of the historical data structure.

11. The computer program product of claim 8, wherein the threshold comprises a data source specific threshold.

12. The computer program product of claim 8, wherein the DCMID comprises a data source specific DCMID with a data source specific size and composition.

13. The computer program product of claim 8, wherein the real time data structure stores real time data change messages and wherein the computer readable program when executed on a computer causes the computer to:

process the real time data change messages in the real time data structure when the switching is concluded.

14. The computer program product of claim 8, wherein the computer readable program when executed on a computer causes the computer to:
perform clean up by freeing resources associated with the switching, closing the historical data stream, and signaling that the switching has completed.

15. A system, comprising:
hardware logic performing operations, the operations comprising:
while accepting data change messages from one of a historical data stream and a real time data stream,
obtaining a data change message identifier (DCMID) for a data change message;
determining whether the data change message is from a real time data stream;
in response to determining that the data change message is from the real time data stream, processing the DCMID against a historical data structure to determine whether the related data change message has been seen in the historical data stream;
in response to determining that the data change message is from the historical data stream, processing the DCMID against a real time data structure to determine whether the related data change message has been seen in the real time data stream;
determining whether a threshold for a number of DCMIDs that correspond to each other in the real time data stream and the historical data stream has been met; and
in response to determining that the threshold has been met, switching from capturing data change messages in the historical data stream to capturing data change messages in the real time data stream.

16. The system of claim 15, wherein operations for processing the DCMID using the historical data structure further comprise:
determining whether the DCMID is in the historical data structure;
in response to determining that the DCMID is in the historical data structure, removing an entry including the DCMID from the historical data structure and updating one or more counts of a number of matches in the historical data structure; and
in response to determining that the DCMID is not in the historical data structure, adding an entry including the DCMID to an end of the real time data structure.

17. The system of claim 16, wherein operations for processing the DCMID using the real time data structure further comprise:
in response to determining that the data change message is from a historical data stream,
determining whether the DCMID is in a real time data structure;
in response to determining that the DCMID is in the real time data structure, removing an entry including the DCMID from the real time data structure and updating one or more counts of a number of matches in the real time data structure; and
in response to determining that the DCMID is not in the real time data structure, adding an entry including the DCMID to an end of the historical data structure.

18. The system of claim 15, wherein the threshold comprises a data source specific threshold.

19. The system of claim 15, wherein the DCMID comprises a data source specific DCMID with a data source specific size and composition.

20. The system of claim 15, wherein the real time data structure stores real time data change messages and the operations further comprise:
processing the real time data change messages in the real time data structure when the switching is concluded.

21. The system of claim 15, wherein the operations further comprise:
performing clean up by freeing resources associated with the switching, closing the historical data stream, and signaling that the switching has completed.

* * * * *